United States Patent
Salaam et al.

(10) Patent No.: US 12,242,820 B2
(45) Date of Patent: Mar. 4, 2025

(54) GENERATING SYNTHETIC CODE-SWITCHED DATA FOR TRAINING LANGUAGE MODELS

(71) Applicant: Adobe Inc., San Jose, CA (US)

(72) Inventors: Cesa Salaam, Upper Marlboro, MD (US); Seunghyun Yoon, San Jose, CA (US); Trung Huu Bui, San Jose, CA (US); Franck Dernoncourt, San Jose, CA (US)

(73) Assignee: Adobe Inc., San Jose, CA (US)

( * ) Notice: Subject to any disclaimer, the term of this patent is extended or adjusted under 35 U.S.C. 154(b) by 452 days.

(21) Appl. No.: 17/651,555

(22) Filed: Feb. 17, 2022

(65) Prior Publication Data
US 2023/0259718 A1    Aug. 17, 2023

(51) Int. Cl.
*G10L 15/22*   (2006.01)
*G06F 40/47*   (2020.01)
*G06F 40/58*   (2020.01)
*G06N 3/045*   (2023.01)
*G06N 3/08*    (2023.01)

(52) U.S. Cl.
CPC .............. *G06F 40/58* (2020.01); *G06F 40/47* (2020.01); *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 6,782,510 B1 * | 8/2004 | Gross | G06F 40/253 704/10 |
| 9,405,741 B1 * | 8/2016 | Schaaf | G10L 13/00 |
| 11,010,687 B2 * | 5/2021 | Mehdad | G06N 20/00 |
| 11,095,585 B2 * | 8/2021 | Prabhu | H04L 51/046 |

(Continued)

OTHER PUBLICATIONS

Aguilar, G. et al. "LinCE: A Centralized Benchmark for Linguistic Code-switching Evaluation", Proc. of the 12th Conference on Language Resources and Evaluation (LREC 2020), pp. 1803-1813, 2020.

(Continued)

*Primary Examiner* — Neeraj Sharma
(74) *Attorney, Agent, or Firm* — Weaver Austin Villeneuve & Sampson LLP

(57) ABSTRACT

Techniques for training a language model for code switching content are disclosed. Such techniques include, in some embodiments, generating a dataset, which includes identifying one or more portions within textual content in a first language, the identified one or more portions each including one or more of offensive content or non-offensive content; translating the identified one or more salient portions to a second language; and reintegrating the translated one or more portions into the textual content to generate code-switched textual content. In some cases, the textual content in the first language includes offensive content and non-offensive content, the identified one or more portions include the offensive content, and the translated one or more portions include a translated version of the offensive content. In some embodiments, the code-switched textual content is at least part of a synthetic dataset usable to train a language model, such as a multilingual classification model.

15 Claims, 6 Drawing Sheets

(56) References Cited

U.S. PATENT DOCUMENTS

| | | | | |
|---|---|---|---|---|
| 11,829,717 | B1* | 11/2023 | Chen | G06N 3/048 |
| 11,861,512 | B1* | 1/2024 | Joshi | G06N 20/00 |
| 2010/0280828 | A1* | 11/2010 | Fein | G10L 15/1822 |
| | | | | 704/E15.005 |
| 2011/0137948 | A1* | 6/2011 | Davis | G06F 16/289 |
| | | | | 707/E17.055 |
| 2011/0307241 | A1* | 12/2011 | Waibel | G06F 40/44 |
| | | | | 704/2 |
| 2014/0337989 | A1* | 11/2014 | Orsini | H04L 51/212 |
| | | | | 726/26 |
| 2015/0309987 | A1* | 10/2015 | Epstein | G06F 40/30 |
| | | | | 704/9 |
| 2020/0126533 | A1* | 4/2020 | Doyle | G10L 15/063 |

OTHER PUBLICATIONS

Bohra, A. et al. "A Dataset of Hindi-English Code-Mixed Social Media Text for Hate Speech Detection", Proc. of the Second Workshop on Computational Modeling of People's Opinions, Personality, and Emotions in Social Media, pp. 36-41, 2018, doi: 10.18653/v1/W18-1105.

Chakravarthi, B. R. et al. "Corpus Creation for Sentiment Analysis in Code-Mixed Tamil-English Text", Proc. of the 1st Joint Spoken Language Technologies for Under-resourced languages (STLU) and Collaboration and Computing for Under-Resourced Languages (CCURL) Workshop (STLU-CCURL 2020), pp. 202-210, 2020.

Claesson, C. et al. "Weakly Supervised Deep Learning Classification: Concept Classification from Electronic Health Records without Ground Truth Data", Master's thesis in Complex Adaptive Systems, Department of Physics, Chalmers University of Technology, 2021, URL: https://odr.chalmers.se/handle/20.500.12380/302595.

Conneau, A. et al. "Unsupervised Cross-lingual Representation Learning at Scale", Proc. of the 58th Meeting of the Association for Computational Linguistics, pp. 8440-8451, 2020.

Devlin J., et al., "BERT: Pre-Training of Deep Bidirectional Transformers for Language Understanding", Proc. of NAACL-HLT 2019, Available online at: https://arxiv.org/pdf/1810.04805.pdf, May 24, 2019, 16 pages.

Fan, A. et al. "Beyond English-Centric Multilingual Machine Translation", Journal of Machine Learning Research, 22:1-48, 2021.

Gaskins, D. et al. "A Crosslinguistic Study of Child Code-Switching within the Noun Phrase: A Usage-Based Perspective", Languages 6(1): 29, Feb. 13, 2021, doi: 10.3390/languages6010029.

Gu, X. et al. "UCPhrase: Unsupervised Context-aware Quality Phrase Tagging", KDD '21, Proc. of the 27th ACM SIGKDD Conference on Knowledge Discovery & Data Mining, pp. 478-486, Aug. 2021, doi: 10.1145/3447548.3467397.

Gupta, A. et al. "Unsupervised Self-Training for Sentiment Analysis of Code-Switched Data", Proc. of the Fifth Workshop on Computational Approaches to Linguistic Code-Switching (2021), arXiv:2103.14797v2 [cs.CL], Oct. 1, 2021.

Hatebase [online]. Hatebase—a collaborative, regionalized repository of multilingual hate speech. URL: https://hatebase.org/.

Kapoor, R. et al. "Mind Your Language: Abuse and Offense Detection for Code-Switched Languages", Proc. of the Thirty-Third AAAI Conference on Artificial Intelligence (AAAI-19), vol. 33:9951-9952, Jul. 2019, doi: 10.1609/aaai.v33i01.33019951.

Mandl, T. et al. "Overview of the HASOC Track at FIRE 202: Hate Speech and Offensive Content Identification in Indo-European Languages", CEUR Workshop Proceedings: Forum for Information Retrieval Evaluation (FIRE '20), vol. 2826, Dec. 2020, 25 pages.

Mathew, B. et al. "HateXplain: A Benchmark Dataset for Explainable Hate Speech Detection", Proc. of the Thirty-Fifth AAAI Conference on Artificial Intelligence (AAAI-21), 35(17):14867-14875, May 18, 2021.

Mehra, S. "Detection of Offensive Language in Social Media Posts", Thesis for: MSc Artificial Intelligence, Faculty of Engineering and Science Department of Computer Science, Cork Institute of Technology, May 2020, doi: 10.13140/RG.2.2.23097.80485.

Pant, K. et al. "Towards Code-switched Classification Exploiting Constituent Language Resources", Proc. of the 1st Conference of the Asia-Pacific Chapter of the Association for Computational Linguistics and the 10th International Joint Conference on Natural Language Processing: Student Research Workshop, pp. 37-43, 2020.

Parafita Couto, M. C. et al. "Code-switching within the noun phrase: Evidence from three corpora", International Journal of Bilingualism, 23(2):695-714, 2019, doi: 10.1177/1367006917729543.

Patwa, P. et al. "SemEval—2020 Task 9: Overview of Sentiment Analysis of Code-Mixed Tweets", Proc. of the 14th International Workshop on Semantic Evaluation, pp. 774-790, Dec. 2020, doi: 10.18653/v1/2020.semeval-1.100.

Pitsilis, G. et al. "Effective hate-speech detection in Twitter data using recurrent neural networks", Applied Intelligence, 48:4730-4742, Jul. 26, 2018, doi: 10.1007/s10489-018-1242-y.

Pratapa, A. et al. "Language Modeling for Code-Mixing: The Role of Linguistic Theory based Synthetic Data", Proc. of the 56th Annual Meeting of the Association for Computational Linguistics (Long Papers), pp. 1543-1553, Jul. 2018, doi: 10.18653/v1/P18-1143.

Qin, L. et al. "CoSDA-ML: Multi-Lingual Code-Switching Data Augmentation for Zero-Shot Cross-Lingual NLP", Proc. of the Twenty-Ninth International Joint Conference on Artificial Intelligence (IJCAI-20), arXiv:2006.06402v2 [cs.CL], Jul. 13, 2020.

Roy, S. G. et al. "Leveraging Multilingual Transformers for Hate Speech Detection", CEUR Workshop Proceedings: Forum for Information Retrieval Evaluation (FIRE '20), arXiv:2101.03207v1 [cs.CL], Jan. 8, 2021.

Saha, K. et al. "Prevalence and Psychological Effects of Hateful Speech in Online College Communities", WebSci '19: Proc. of the 10th ACM Conference on Web Science, vol. 2019:255-264, 2019, doi: 10.1145/3292522.3326032.

Samanta, B. et al. "NEVAE: A Deep Generative Model for Molecular Graphs", Proc. of the Thirty-Third AAAI Conference on Artificial Intelligence (AAAI-19), 33(01):1110-1117, Jul. 17, 2019, doi: 10.1609/aaai.v33i01.33011110.

Sanh, V. et al. "DistilBERT, a distilled version of BERT: smaller, faster, cheaper and lighter", 5th Workshop on Energy Efficient Machine Learning and Cognitive Computing—NeurIPS 2019, arXiv:1910.01108v4 [cs.CL], Mar. 1, 2020.

Tang, T. et al. "Fine-Tuning BERT for Multi-Label Sentiment Analysis in Unbalanced Code-Switching Text", IEEE Access, vol. 8:193248-193256, 2020, doi: 10.1109/ACCESS.2020.3030468.

Winata, G. I. et al. "Code-Switched Language Models Using Neural Based Synthetic Data from Parallel Sentences", Proc. of the 23rd Conference on Computational Natural Language Learning (CoNLL), pp. 271-280, Nov. 2019, doi: 10.18653/v1/K19-1026.

\* cited by examiner

GENERATING SYNTHETIC CODE-SWITCHED DATA FOR TRAINING LANGUAGE MODELS

BACKGROUND

1. Field of Disclosure

The present disclosure relates generally to the fields of semantic processing and machine learning, and more particularly, to generation of code-switched text useful for training a machine learning model.

SUMMARY

Techniques for training a language model for code switching content are disclosed.

In one aspect of the present disclosure, a method of training a language model for code switching content is disclosed. In some embodiments, the method includes generating a dataset; and training a multilingual classification model.

In some variants, the generating of the dataset includes: identifying one or more portions within textual content in a first language, the identified one or more portions each comprising one or more of offensive content or non-offensive content, the identifying comprising tagging, based on an output of a first trained language model, the one or more portions with at least one content tag; translating the tagged one or more portions to a second language using a second trained language model; and replacing, in the textual content, the tagged one or more portions with the translated one or more portions to generate code-switched textual content.

In some variants, the training of the multilingual classification model includes: receiving the generated code-switched textual content at the multilingual classification model; determining one or more training metrics based on evaluation of an output of the multilingual classification model with respect to the generated code-switched textual content; and adjusting a parameter of the multilingual classification model based on the one or more training metrics.

In another aspect of the present disclosure, a method of generating code-switched content for training a language model is disclosed. In some embodiments, the method includes: identifying one or more portions within textual content in a first language, the identified one or more portions each comprising one or more of offensive content or non-offensive content, the identifying comprising tagging, based on an output of a first trained language model, the one or more portions with at least one content tag; translating the tagged one or more portions to a second language using a second trained language model; and replacing, in the textual content, the tagged one or more portions with the translated one or more portions to generate code-switched textual content.

In another aspect of the present disclosure, a method of implementing a language model to detect code-switched offensive content is disclosed. In some embodiments, the method includes: obtaining a given textual content in a first language and a second language; detecting offensive content within the given textual content using the language model, non-offensive content being in at least the first language, and the offensive content being in at least the second language; and based on the detecting of the offensive content, performing remedial measures with respect to the given textual content.

In some variants, the language model is trained at least by: receiving code-switched textual content; determining one or more training metrics based on evaluation of an output of the language model with respect to the code-switched textual content; and adjusting a parameter of the language model based on the one or more training metrics.

BRIEF DESCRIPTION OF THE DRAWINGS

Like reference numbers and designations in the various drawings indicate like elements.

DETAILED DESCRIPTION OF EMBODIMENTS

Figure 1:
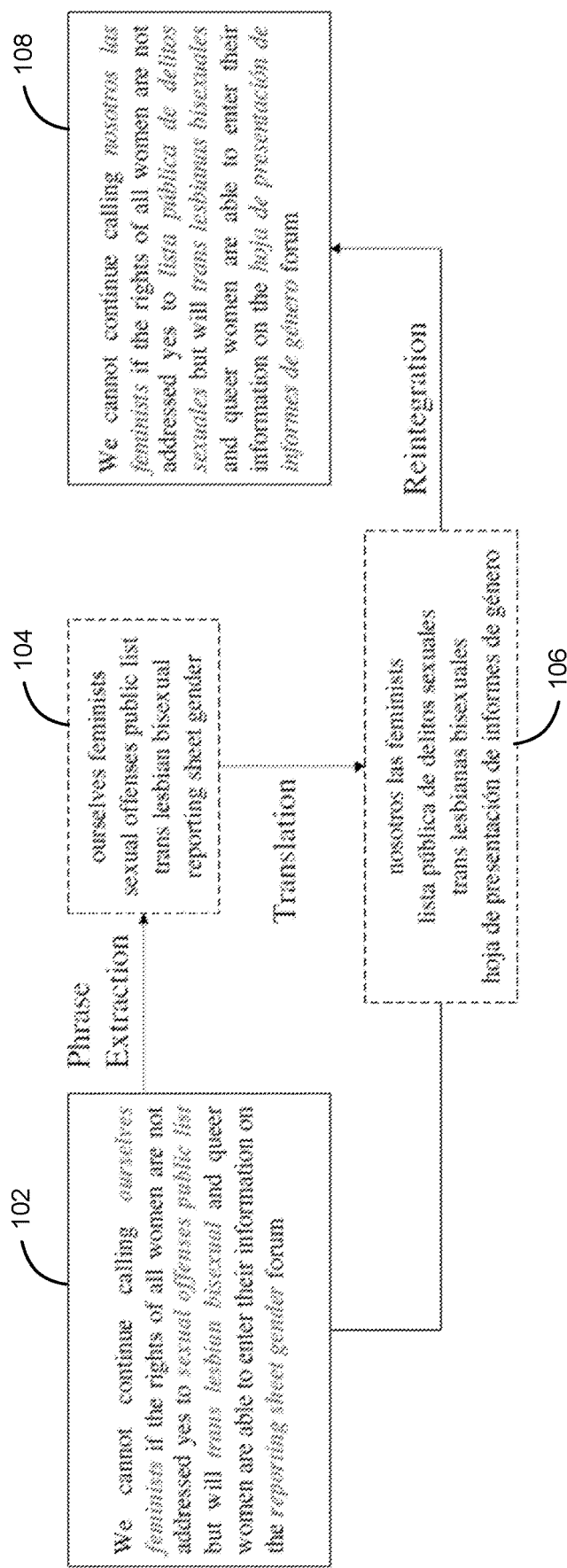
FIG. 1 is a block diagram illustrating an overview of a framework for generating synthetic data for code-switching tasks, according to various embodiments.

User-generated content has become pervasive and a frequent mode of social interaction, especially over the Internet in social-media platforms, customer-service chat boxes, online communities, chat rooms, comment sections, etc. However, the prevalent use of offensive content (e.g., abusive speech, hate speech, slurs) in such platforms has become a reason for concern. The use of offensive in online social settings can have negative effects on the psycho-emotional state of users.

In some cases, textual content can contain code switching, which is a combination of two or more languages in a single conversation. Code switching can occur intra-sententially within sentences or inter-sententially across sentences. For example, offensive words may be written in another language swapped out in a comment in an environment that is primarily one language to conceal the offensiveness to some users but target others who recognize the other language. Classifying offensive content in online settings or other communication platforms is thus an essential task in many applications to foster a safe and welcoming environment for user interaction.

However, addressing code switching is a growing challenge in the field of content detection. Since code switching is a combination of multiple languages, the amount of training resources such as labeled code-switching data especially for various language combinations is extremely low. Moreover, code switching can be nuanced and highly subjective depending on context and circumstance, so the combination of code switching and offensive content increases the complexity of the classification task. It is therefore difficult to train a language model such as a multilingual classification model to detect offensive content, and creating viable synthetic data that can serve in place of real-world data for training purposes is needed.

To this end, among other things, techniques for creating a synthetic training set are provided herein. This obviates the need to rely upon human-generated code-switched abusive content. One aspect of the present disclosure is detection of abusive or offensive content that is written in mixed, two or more different languages. Another aspect is creating synthetic code-switched data with offensive and/or non-offensive content useful for train a language model for aforementioned detection.

Synthetic Code-Switching Generation Framework

Techniques for generation of synthetic code-switched data exist. One example is theory-based synthetic data generation. So-called Equivalency Theory (EC Theory) describes a code-mixed (code-switched) sentence as a constrained combination of two sentences that are equivalent. Another example is neural-based synthetic data generation. A sequence-to-sequence model using a copy mechanism is used to generate code-switched data based on parallel sentence translations from a small source of code-switched data. Another example is generative synthetic data generation. Generative adversarial networks (GANs) and variational autoencoders can synthesize plausible monolingual text, but they lack the ability to adequately address code-switched (multilingual) text. Another example is the usage of a variational autoencoder architecture for code switching. An example in the context of offensive content or speech is a technique that splits a code-switched sentence to its constituent high-resource languages to exploit both monolingual and cross-lingual settings. Another example is the application of transfer learning and long short-term memory (LSTM), which is a type of a recurring neural network (RNN) architecture. A LSTM-based model is used for detection of hate speech and offensive speech.

However, the above existing approaches to synthetic data generation and classification are limited in that they require larger amounts of data to work effectively. The limited amount of resources (e.g., readily available data, e.g., code-switched textual content, for training a model) is a challenge that must be addressed for greater effectiveness in the training of a multilingual classification model and the detection of offensive content using the trained model.

FIG. 1 is a block diagram illustrating an overview of a framework for generating synthetic data for code-switching tasks, according to various embodiments. In some embodiments, generation of synthetic code-switched data occurs in three stages: phrase identification and extraction, phrase translation, and phrase reintegration.

Block 102 illustrates a dataset including a source text. In some embodiments, the source text includes monolingual textual content. For example, the textual content is a collection of words, sentences, paragraphs, etc. in a single language, such as English. In other embodiments, the source text is literally any one of various other languages. In some cases, the language of the source text can even be a fictional language understood by some users.

One or more phrases are identified from the source text. In some embodiments, a language model is used to identify salient portions, such as salient phrases or sentences. In some implementations, the language model has been trained using real-world abusive speech datasets written in mixed languages, and is thereby configured to any include offensive content within the identified one or more salient portions.

In some implementations, such a language model has been trained using unsupervised (unlabeled) training to preserve contextual completeness, as opposed to context-agnostic supervised training. In this way, a quality portion or a salient portion (e.g., phrase, word sequence) of textual content is determined. Where the real-world abusive speech datasets are provided to the language model during training, offensive content can be included in the identified salient textual portions.

More specifically, in some embodiments, the trained language model is configured to identify "silver label" salient portions. As an aside, "gold labels" refer to labels produced by an annotator (e.g., an expert or another human) that can represent a reliable ground-truth value. As referred to herein, a silver label relates to a context-aware semantic portion (also referred to as a "core phrase," e.g., a word or a phrase, or at least one sentence) within textual content (e.g., a document or an excerpt thereof, e.g., a paragraph, where a document refers to a collection of sentences) having a quality that indicates saliency of the semantic portion. Saliency indicates, in some cases, e.g., informativeness or relevance and/or offensiveness (e.g., where the language model is provided information from aforementioned abusive speech datasets), and thus are of interest within the textual content. A qualitative trait such as saliency can be determined using quantitative or objective criteria as described below.

For example, in some implementations, a salient semantic portion of the textual content (e.g., source text) is identified based on identifying a "noun phrase." One example of a noun phrase is a simplex noun phrase, which is a combination of a determiner (e.g., articles such as "a" or "an," or an indicator such as "some") and a noun. Another example of a noun phrase is a complex noun phrase, which is a combination of a determiner, an adjective, and a noun. In some code-switching scenarios in some languages, common switching patterns involve simplex and/or complex noun phrases. Hence, noun phrases are one indication of saliency within the textual content.

In some implementations, a salient portion is identified based on its correlation to the training datasets used during training of the language model. In some cases, some datasets are identified as containing salient labels (e.g., words, phrases), and the aforementioned real-world abusive speech datasets used for training the language model are a basis or a factor in identifying a semantic portion as salient. For example, if a certain offensive phrase appears in an abusive speech dataset, that phrase is assigned a higher weight, e.g., a higher saliency factor, which increases the weight associated with identifying or labeling the phrase as salient.

In some implementations, a salient portion is identified based on a so-called maximal contiguous word sequence (or a maximally frequent contiguous word sequence or semantic portion) that appears in a document more than once. "Maximal" here means that if the word sequence were further expanded toward the left or right, its frequency within the document would drop. As an example, a core phrase is "heat island effect" because it appears more frequently than the phrase "island effect," the phrase "heat island effect is," or the phrase "the heat island effect." In some cases, a core phrase is a noun phrase (e.g., "New York," "heat island effect"), rather than transition phrases (e.g., "cities including New York") or phrases that include a definite article or an indefinite article ("the heat island effect").

In some implementations, extraneous words such as "cities including" is considered noise within the textual content. In some implementations, noise can be determined by comparing a maximal contiguous word sequence and less frequent but consistent word sequences. Textual content can be denoised to yield the silver labels; for example, "cities including" can be discarded or ignored from the phrase "cities including New York" to yield the salient phrase "New York".

In some cases, the salient portion silver label or core phrase is a word sequence that contains at least a prescribed number of words and/or at most a prescribed number of words. For example, in some implementations, a phrase containing two to five words is considered a potential core phrase or silver label, and a single word is not considered a core phrase or a silver label.

In some implementations, salient portions are determined based on a combination of the above factors, e.g., one or more simplex or complex noun phrases of the textual content, one or more maximally frequent contiguous portions of the textual content, one or more salient portions of the textual content determined based at least on a training dataset used by the first trained language model, one or more denoised portions of the textual content, or a combination thereof.

In some embodiments, the trained language model uses a tagging method, where the text is passed into the model to generate discrete spans corresponding to the salient portions (silver labels) in the text. Referring back to block 102, in some embodiments, salient portions of the source text are tagged with at least one content tag. As an example, a content tag such as an end-of-sentence (EOS) token may be inserted to the end of each salient portion. As another example, each salient portion may be tagged with a content tag such as a beginning-of-sentence (BOS) token. In some cases, EOS and BOS tokens allow the tagged content to be parsed and/or extracted. In some implementations, each salient portion may be tagged with both a BOS token and an EOS token. That is, a BOS token may be added to the start of the salient portion, and an EOS token may be added to the end of the salient portion. In some embodiments, portions that are not tagged are discarded from the dataset.

In some embodiments, the identified and/or tagged portions of the source text are extracted and isolated in a separate dataset. In some cases, these identified portions include offensive content and non-offensive content (e.g., a mix of at least one offensive word and at least one non-offensive word). In some cases, these identified portions include non-offensive content only. In some cases, these identified portions include offensive content only. Examples of the identified portions are in italics in block 102. Block 104 illustrates the extracted portions from the source text 102. In some implementations, the extracted portions are words or phrases. In other implementations, the extracted portions are longer, e.g., one or more sentences.

In some embodiments, each of the extracted portions 104 is translated using a language model. In some implementations, the language model to translate the extracted portions 104 is a different language model from that used for identification of the phrases. In some embodiments, this second language model is a neural machine translation model has been trained to translate between one language to another language. In some implementations, the translation model has been trained to recognize over 100 languages and translate between any two of them. One example of the translation model is EasyNMT, an open-source neural machine translation model. In other examples, another neural machine translation model is used. The extracted portions 104 are fed into the translation model and translated to a destination language of choice. Block 106 illustrates examples of the translated portions.

In some embodiments, the translated portions are reintegrated into the source text 102. More specifically, in some implementations, the portions of the textual content which correspond to the translated portions are replaced with the translated portions, resulting in code-switched textual content. As block 108 illustrates, portions of the source text 102 have been replaced by the translated portions in italics. The replaced or reintegrated text 108 is at least a portion of a synthetic code-switched dataset can be used for training a language model, e.g., a multilingual classification model. In some embodiments, as will be discussed elsewhere below, the multilingual classification model to be trained includes an XLM-RoBERTa (Cross-lingual Language Model Robustly Optimized Bidirectional Encoder Representations from Transformers (BERT) Pre-training Approach) model. In some embodiments, the multilingual classification model used is M-BERT (multilingual BERT). In some embodiments, the multilingual classification model used is multilingual DistilBERT.

Thus, the foregoing process advantageously generates datasets for a training task that is greatly lacking in resources, without requiring manual code switching (e.g., without having humans create mixed-language text samples).

Figure 2:
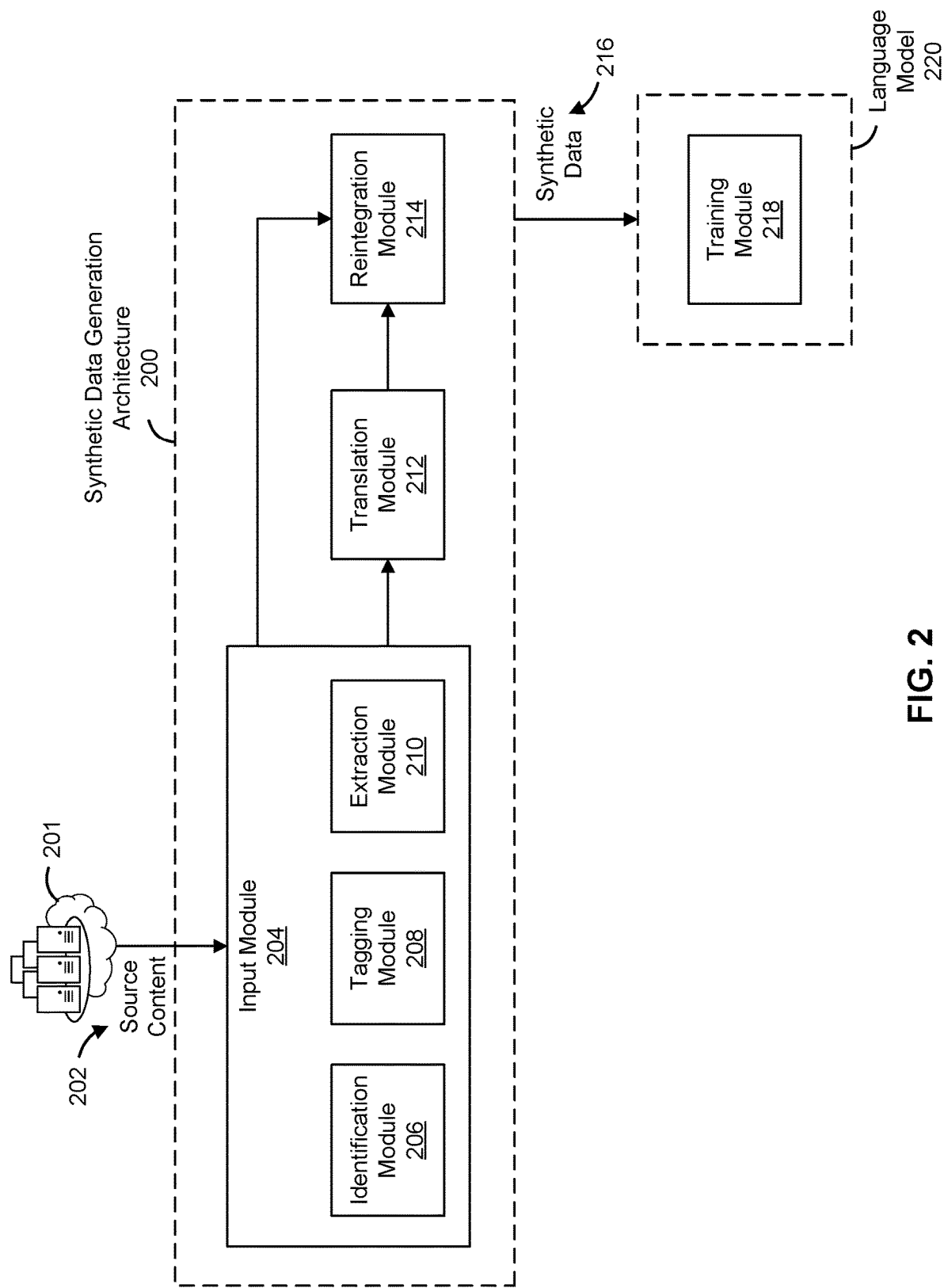
FIG. 2 is a block diagram illustrating an architecture for synthetic data generation, according to various embodiments.

FIG. 2 is a block diagram illustrating an architecture 200 for synthetic data generation, according to various embodiments. The synthetic data generation architecture 200 is configured to receive an input. In some embodiments, the input includes source content 202 (e.g., monolingual source text 102) from a source 201 (e.g., storage, database, a remote server). The input is received by input module 204.

In this context, a module refers to at least a portion of computer-executable instructions. In some embodiments, a module is implemented by a hardware processor configured to execute the corresponding computer-executable instructions. A hardware processor is an integrated circuit device associated with a computing device, such as a server or a user device (e.g., a desktop computer, a laptop computer, a tablet computer, a mobile phone, or the like), which is programmable to perform specific tasks. In some embodiments, multiple modules are implemented as a single module. In some embodiments, a single module is implemented as multiple modules. In some embodiments, two or more modules are executable by the same device (e.g., the same server, the same computing device).

In some embodiments, the input module 204 includes one or more modules such as an identification module 206, a tagging module 208, and an extraction module 210. In some embodiments, the identification module 206 is configured to identify salient portions (e.g., phrases). For example, silver labels can be detected using a language model trained to detect core phrases based at least on frequency, maximal contiguous word sequences, or quality that indicates saliency. As another example, textual content can be denoised to remove extraneous words to yield the silver labels.

In some cases, the identified salient portions include offensive content and non-offensive content (e.g., a mix of at least one offensive word and at least one non-offensive word). In some cases, the identified salient portions include non-offensive content only. In some cases, the identified salient portions include offensive content only.

In some embodiments, the tagging module 208 is configured to tag the identified salient portions. In some implementations, EOS and/or BOS tokens are inserted to the end and/or the beginning of each identified salient portion, respectively. In some cases, EOS and BOS tokens allow the tagged content to be parsed and/or extracted, e.g., by the extraction module 210.

In some embodiments, the extraction module 210 is configured to isolate the identified and tagged portions of the source text. In some implementations, these identified and tagged portions of the source text are collected and stored in a dataset. Extracted portions 104 of FIG. 1 are an example of the identified and tagged portions.

In some embodiments, the extracted portions are transmitted to and received by a translation module 212. In some implementations, the translation module 212 is configured to translate the extracted portions using a language model trained to translate between a first language (e.g., the language of the monolingual source text 202) to a second, destination language that is different from the first language. In some implementations, the translation module 212 is configured to translate from the second language to the first language, and/or from the first language to at least a third language. The translation module 212 outputs translated portions, which are a translated version of the extracted portions. Translated portions 106 of FIG. 1 are an example of the translated portions. In certain cases, the translation occurs multiple times to the second language and/or at least a third language.

In some embodiments, the translated portions are transmitted to and received by a reintegration module 214. In some implementations, the reintegration module 214 is configured to replace corresponding portions of the source content 202 with the translated portions to generate reintegrated text, which is code-switched textual content. Reintegrated text 108 of FIG. 1 is an example of the code-switched textual content. The code-switched textual content is a combination of two languages, or in certain cases, three or more languages. In some implementations, the code-switched textual content is part of synthetic data 216 that is output from the architecture 200 (e.g., from the reintegration module 214). In some implementations, the synthetic data is contained within at least a data structure, such as a text file, JavaScript Object Notation (JSON) file, a comma-separated values (CSV) file, a lookup table, or the like.

The synthetic data 216 can be used to train a language model 220, e.g., a multilingual classification model. To this end, in some embodiments, the synthetic data 216 is transmitted to and received by a training module 218. In some cases, the training module 218 is part of the language model 220 to be trained. The training module 218 is configured to determine one or more training metrics, including loss (e.g., using a cross-entropy function as a loss function to minimize the error) and/or performance metrics as discussed below (e.g., precision, recall, F1 scores, accuracy, weighted accuracy, error rate), and update the language model's parameters (e.g., learning rates, weights) based thereon. In some cases, the training module 218 is external to the language model 220 to be trained, in which case parameters are updated and passed to at least the language model. Further details and examples regarding the training is described in the context of example training and evaluation with synthetic data below.

Example Evaluations of Synthetic and Benchmark Data

To evaluate the efficacy of synthetic data generated according to the techniques described herein, code-switched combinations were generated in different language pairs. In some evaluations, three language pairs were selected: English-French (EN-FR), English-Spanish (EN-ES), and English-German (EN-DE). In addition, a keyword-based classification algorithm was developed as a baseline model, where four dictionary lexicons of words associated with hate speech were compiled from each selected language—in this case, English, French, Spanish, and German. Each lexicon was used as a look-up table to determine whether words present in given portions (e.g., sentences) were considered offensive or not.

To obtain further benchmark test sets that reflect real-world usage, datasets were built from monolingual hate speech data created from databases of real user text. In some cases, such a database has fine-grained labels indicating the span related to the abusiveness. Human annotators were commissioned to create two different types of testsets. First, human annotators who could speak at least two relevant languages were asked to translate the label-marked span (e.g., pre-detected abusive or offensive words) into another language, replacing offensive content with a translated version of the offensive content. For example, one or more offensive phrases within a source text were swapped with translated versions of the phrases (herein referred to as a SWAP dataset or testset). In some cases, annotators partially swapped portions of the source text with translations. Second, human annotators were asked to rewrite textual content containing abusive or offensive content into code-mixed content (herein referred to as a REWRITE dataset or testset). That is, paraphrasing was allowed as deemed appropriate by the annotator, as opposed to a more direct, mechanical replacement of words in SWAP testsets. For example, a sentence in one language containing abusive or offensive words was rewritten into a sentence in two languages with at least the offensive portions translated. Put another way, SWAP and REWRITE datasets were ground truths against which performance of model-generated datasets could be compared and evaluated. Table 1 shows examples of the input and the output from the annotators.

TABLE 1

Examples of human-generated code-mixed text, with bolded portions indicating pre-detected portions to swap. Not all portions were swapped in some cases.

| Type | Original text | Annotation |
| --- | --- | --- |
| SWAP (EN-DE) | backpedaling fails to point out exactly my comments and resumes to nonsensical aussie retarded babbles go choke on a cock you useless wrinkly aussie slag you are the descendants of the bottom feeders among limeys loll | Backpedalismus versagt, um genau meine Kommentare und Wiederholungen zu unsinnigen aussie retarded babbles gehen auf einem Hahn Sie nutzlos faltig aussie Schlampe wurgen Sie sind die Nachkommen der Bottom Feeder unter limeys loll |

TABLE 1-continued

Examples of human-generated code-mixed text, with bolded portions indicating pre-detected portions to swap. Not all portions were swapped in some cases.

| Type | Original text | Annotation |
|---|---|---|
| SWAP (EN-FR) | if your humor is based on racism homosexualphobia sexism and rape you are not fucking funny go home | if your humor is based on racism homosexual phobia sexism and rape, no eres jodidamente divertido, go home. |
| REWRITE (EN-ES) | Omar is a terrorist | Omar is a terrorista |
| REWRITE (EN-ES) | ferretvillager thats so stupid | ferretvillager Eso es tan stupid |

According to various embodiments, the trained language models were XLM-RoBERTa (XLM-R), M-BERT, Distil-BERT, or other multilingual classification models. In some cases, XLM-R was used as an example multilingual classification model to be trained. In implementing the language models trained according to the techniques described herein, code-switched textual content (e.g., a code-switched sentence) was fed to the XLM-R. Further, a [CLS] token (a classification token that represents a sentence-level classification to the language model) was passed through the neural network (e.g., a two-layer fully connected network) implemented by the language model. The final output was compared with the label, which enabled loss to be determined, e.g., using a cross-entropy function as a loss function to minimize the error.

To fine tune the language model, one or more parameters were adjusted as training progresses and outputs are generated from the language model. For example, a learning rate for a training algorithm (e.g., gradient descent) was set to $\alpha=2e-5$ and adjusted (e.g., reduced) over time. Reduction of the learning rate was performed using a learning rate schedule. A learning rate schedule was used to adjust the learning rate during training by reducing the learning rate according to a pre-defined schedule.

In some cases, the scheduling was based on the F1 scores. An F1 score can refer to a mean of precision and recall. In this context, precision refers to the fraction of relevant instances among the retrieved instances, or in other words, true positive observations over true positive observations and false positive observations. Recall refers to the fraction of relevant instances that were retrieved, or in other words, true positive observations over true positive observations and false negative observations. In some cases, the scheduling was based on the loss.

In some cases, to prevent overfitting or overtraining, validation scores were obtained at the end of each training iteration instead of using "early stopping." If the validation performance (e.g., based on a performance metric, e.g., accuracy, error rate, precision, recall, and/or F1 score) decreased through an iteration, the training backtracked to the previous model weights, and learning rate was decreased. Training ended when the learning rate reached a significantly small value. Even though this approach can be computationally expensive (compared to, e.g., early stopping), this type of scheduling guaranteed that the F1 score was maximized. However, in other cases, the extent to which learning rate is decreased and/or how long training lasts (e.g., how many epochs) is determined based on this tradeoff of resource usage and accuracy or other performance metrics, e.g., F1 scores, weighted accuracy (WA), error rate. Weighted accuracy can be determined by taking the average, over all the classes, of the fraction of correct predictions in this class, or the number of correctly predicted instances in that class, divided by the total number of instances in that class.

In some cases, the foregoing training steps are used to train a language model (e.g., as part of methods 400 or 500 described below). Some examples of the language model include but are not limited to multilingual classification models, such as XLM-R or others.

Three types of experiments were run for both a dictionary-based model and a model trained according to the methods disclosed herein: (1) training on a synthetic dataset and testing on human-generated SWAP and REWRITE datasets, (2) training on synthetic and human-generated SWAP datasets, and testing on REWRITE, and (3) training on human-generated SWAP datasets, and testing on REWRITE. It has been shown in some cases that datasets generated using language models trained according to the techniques described herein are associated with higher performance metrics (e.g., accuracy, error rate, precision, recall, and/or F1 scores) over those associated with benchmark testsets manually created by humans and/or baseline models. In some cases, at least 1,000 samples were obtained for each dataset, as shown in Table 2.

TABLE 2

Statistics of the synthetic trainset and human-generated datasets used in at least one example training scenario. Annotators were asked to rewrite a source text into code-mixed text (REWRITE) or translate at least some pre-detected abusive or offensive portions (SWAP).

|  | EN-FR | EN-ES | EN-DE |
|---|---|---|---|
|  | Synthetic trainset | | |
| Number of samples | 9,926 | 9,926 | 9,926 |
| Average word-level length | 27.55 | 27.07 | 28.71 |
|  | Human-generated SWAP testset | | |
| Number of samples | 1,080 | 1,564 | 1,668 |
| Average word-level length | 21.53 | 24.01 | 25.10 |
|  | Human-generated REWRITE testset | | |
| Number of samples | 2,000 | 2,000 | 1,948 |
| Average word-level length | 16.99 | 16.57 | 15.69 |

Example results and observations are shown in terms of F1 score and weighted accuracy (WA) in Tables 3a, 3b, 4 and 5.

TABLE 3a

Examples of accuracy metrics obtained from
a baseline model and a trained model,
with respect to SWAP testsets
(code-mixed textual content
generated by human annotators
by swapping portions of source texts).

| | SWAP testset | | | | | |
| --- | --- | --- | --- | --- | --- | --- |
| | EN-FR | | EN-ES | | EN-DE | |
| Model | F1 | WA | F1 | WA | F1 | WA |
| Dictionary | 0.290 | 0.300 | 0.540 | 0.570 | 0.460 | 0.460 |
| Example Model | 0.550 | 0.580 | 0.530 | 0.550 | 0.670 | 0.670 |

TABLE 3b

Examples of accuracy metrics obtained from
a baseline model and a trained model,
with respect to REWRITE testsets
(code-mixed textual content
generated by human annotators
by rewriting source texts).

| | REWRITE testset | | | | | |
| --- | --- | --- | --- | --- | --- | --- |
| | EN-FR | | EN-ES | | EN-DE | |
| Model | F1 | WA | F1 | WA | F1 | WA |
| Dictionary | 0.660 | 0.680 | 0.670 | 0.690 | 0.370 | 0.510 |
| Example Model | 0.530 | 0.580 | 0.590 | 0.620 | 0.580 | 0.610 |

TABLE 4

Model was trained with synthetic and SWAP
data and evaluated on REWRITE testset.

| | EN-FR | | EN-ES | | EN-DE | |
| --- | --- | --- | --- | --- | --- | --- |
| Model | F1 | WA | F1 | WA | F1 | WA |
| Dictionary | 0.660 | 0.680 | 0.670 | 0.690 | 0.370 | 0.510 |
| Example Model | 0.580 | 0.610 | 0.600 | 0.630 | 0.580 | 0.610 |

TABLE 5

Model was trained with SWAP
data and evaluated on REWRITE testset.

| | EN-FR | | EN-ES | | EN-DE | |
| --- | --- | --- | --- | --- | --- | --- |
| Model | F1 | WA | F1 | WA | F1 | WA |
| Dictionary | 0.660 | 0.680 | 0.670 | 0.690 | 0.370 | 0.570 |
| Example Model | 0.610 | 0.620 | 0.520 | 0.530 | 0.430 | 0.510 |

In some cases, different results were observable in the SWAP and REWRITE testsets, e.g., shown in Tables 3a and 3b. For instance, when code-switching semantics tend toward the swapping of offensive content between languages (SWAP testset), a language model trained on synthetic data generated according to techniques described herein was associated with higher performance metrics than the baseline dictionary-based detection, in some cases with respect to code-switched content where portions were swapped, e.g., for some EN-DE SWAP testsets and some EN-FR SWAP testsets. In some cases, REWRITE testsets exhibited higher performance metrics with a language model trained on synthetic data generated according to techniques described herein and/or on SWAP datasets, compared to the baseline model, e.g., when evaluated on some EN-DE REWRITE testsets. Hence, synthetic data generated according to these techniques was shown to have potential in extending model training sets, e.g., by including synthetic data with currently under-resourced real-world training data.

Methods

Figure 3:
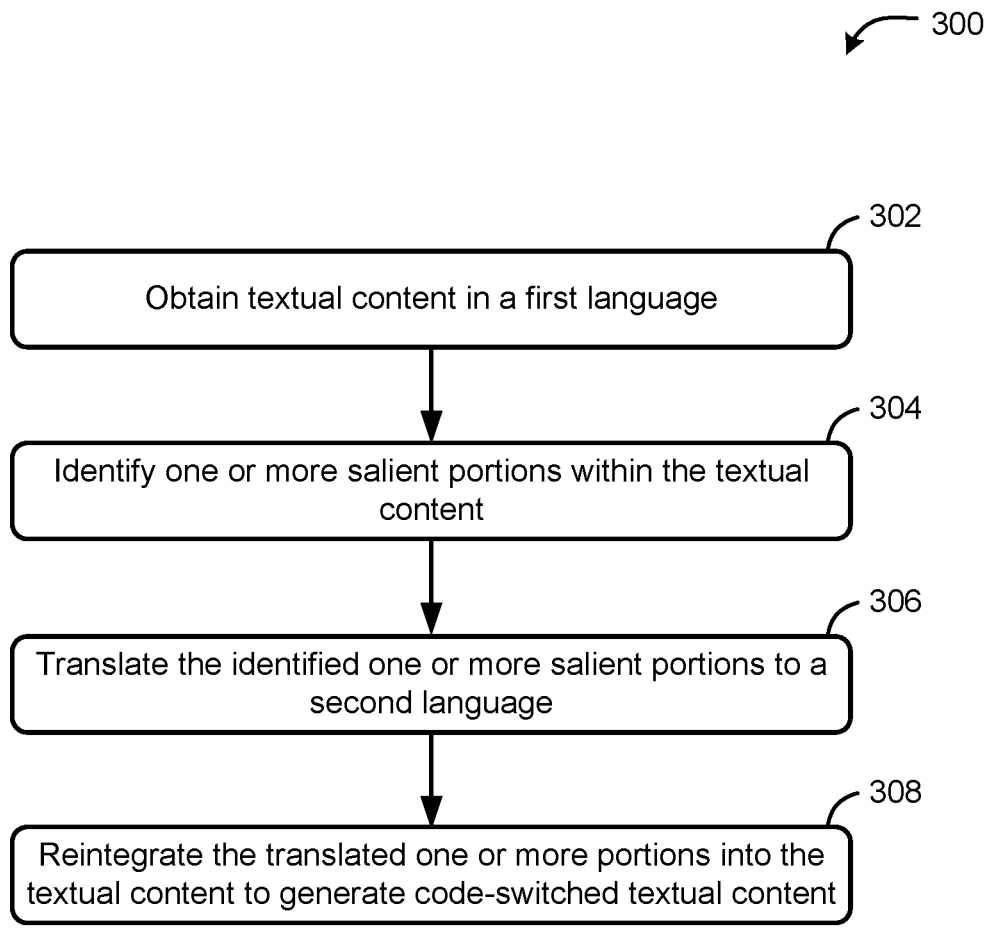
FIG. 3 is a flow diagram of a method of generating synthetic code-switched content, e.g., for training a language model, in accordance with some embodiments.
Figure 6:
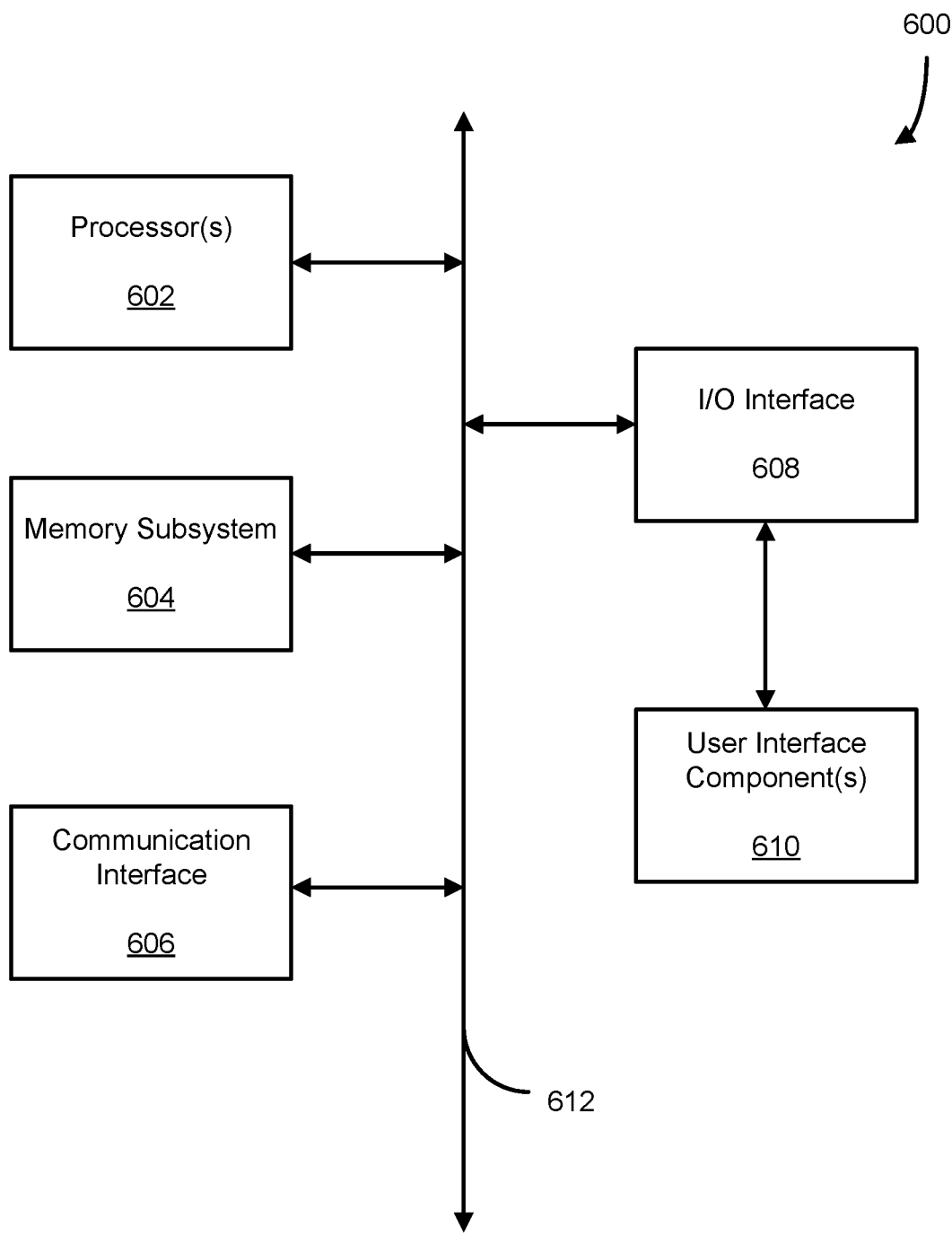
FIG. 6 shows a schematic diagram of an example computing device for implementing the methods, systems, and techniques described herein in accordance with some embodiments.

FIG. 3 is a flow diagram of a method 300 of generating synthetic code-switched content, e.g., for training a language model, in accordance with some embodiments. In some embodiments, the functionality illustrated in one or more of the steps shown in FIG. 3 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architecture of FIG. 2. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 300. Example components of the computerized apparatus are illustrated in FIG. 6, which are described in more detail below.

It also should be noted that the operations of the method 300 may be performed in any suitable order, not necessarily the order depicted in FIG. 3. In some embodiments, at least some portions of the steps may be performed substantially concurrently. Further, the method 300 may include additional or fewer operations than those depicted in FIG. 3 to accomplish the synthetic data generation.

At step 302, the method 300 includes obtaining textual content in a first language. In some embodiments, the textual content is a monolingual source text obtained from a source (e.g., storage, database, a remote server). For example, the textual content is a collection of words, sentences, paragraphs, etc. in a single language, such as English. In other embodiments, the source text is literally any one of various other languages. In some cases, the language of the source text can even be a fictional language understood by some users.

At step 304, the method 300 includes identifying one or more salient portions within the textual content. In some embodiments, salient portions are phrases within the textual content which correspond to "silver labels" or "core portions," which in some cases are context-aware semantic portions detected by a trained language model based at least on frequency, maximal contiguous word sequences, or quality that indicates saliency. In some implementations, the trained language model has been trained using real-world abusive speech datasets written in mixed languages, and is thereby configured to include any offensive content within the identified one or more salient portions. In some implementations, the phrases have a prescribed range of word count, e.g., two to five words. In some embodiments, salient portions are single words or one or more entire sentences. In some embodiments, the identified salient portions are tagged using EOS and/or BOS tokens, at least to enable extraction of the identified and tagged portions. Extracted portions 104 of FIG. 1 are an example of the identified and tagged portions.

At step 306, the method 300 includes translating the identified one or more salient portions to a second language.

In some embodiments, another language model is used to translate the salient portions from the first language to a second language that is different from the first language. Translated portions 106 of FIG. 1 are an example of the translated portions.

At step 308, the method 300 includes reintegrating the translated one or more portions into the textual content to generate code-switched textual content. In some embodiments, the reintegrating includes replacing corresponding portions of the textual content with the translated portions, resulting in the code-switched textual content. In some embodiments, the code-switched textual content is at least a portion of a synthetic dataset can be used for training a language model, e.g., a multilingual classification model. Reintegrated text 108 of FIG. 1 is an example of the reintegrated code-switched textual content.

The method 300 can thereby generate synthetic code-switched data that can be used to train, e.g., the multilingual classification model in an under-resourced environment where real-world training data is costly (requiring, e.g., human annotators who are adept in two or more languages to create code-switched text) and sparse.

Figure 4:
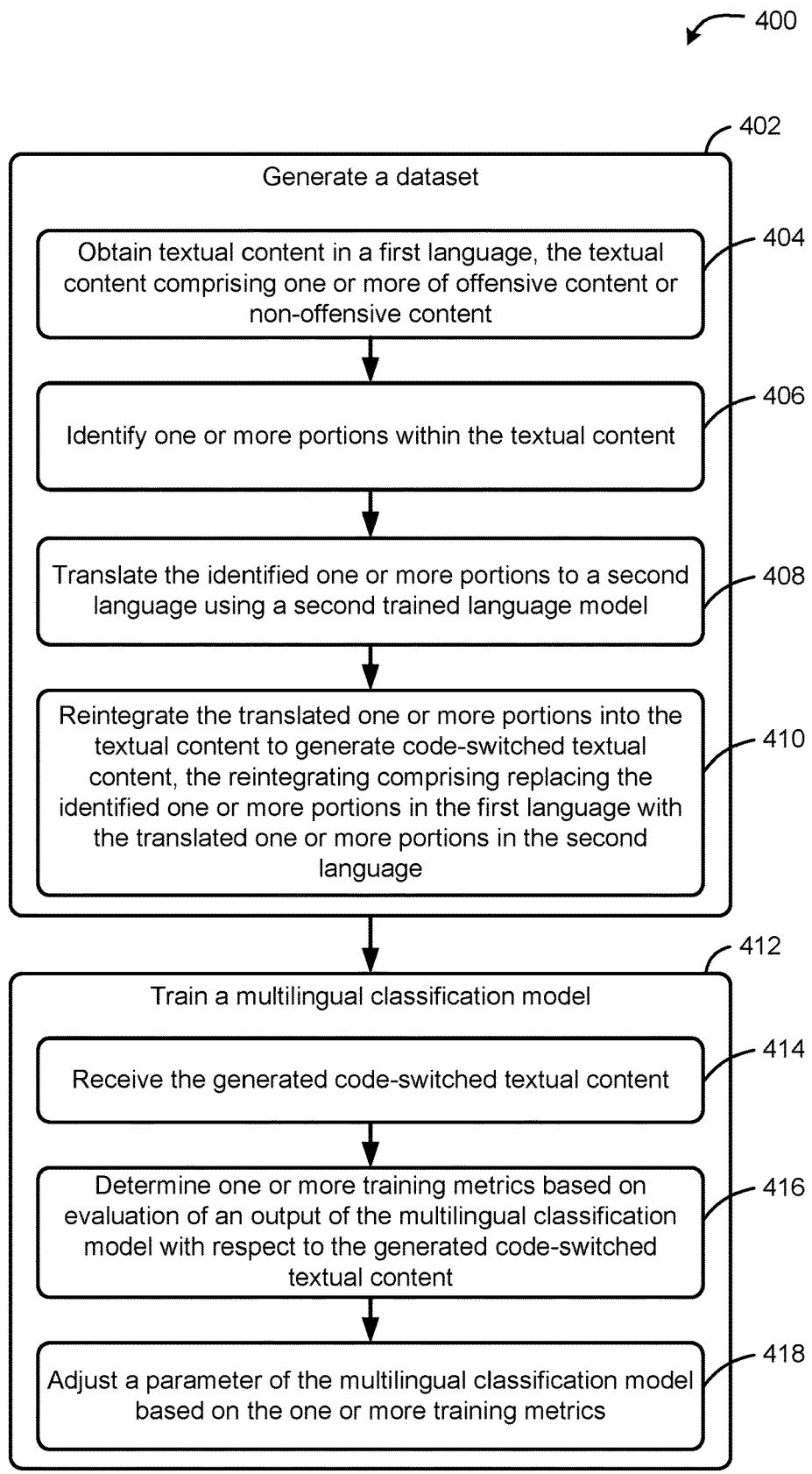
FIG. 4 is a flow diagram of a method of training a language model for code switching content, in accordance with some embodiments.

FIG. 4 is a flow diagram of a method 400 of training a language model for code switching content, in accordance with some embodiments. In some embodiments, the functionality illustrated in one or more of the steps shown in FIG. 4 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architecture of FIG. 2. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 400. Example components of the computerized apparatus are illustrated in FIG. 6, which are described in more detail below.

It also should be noted that the operations of the method 400 may be performed in any suitable order, not necessarily the order depicted in FIG. 4. In some embodiments, at least some portions of the steps may be performed substantially concurrently. Further, the method 400 may include additional or fewer operations than those depicted in FIG. 4 to accomplish the training of the language model (using, e.g., the generated dataset according to some steps below).

At step 402, the method 400 includes generating a dataset. In some embodiments, the dataset includes code-switched textual content, that is, a combination of textual content in multiple languages. In some cases, the code-switched textual content includes, at least in part, offensive content in a different language than the rest of the content. Block 108 of FIG. 1 is an example of the code-switched textual content having offensive and non-offensive content that has been translated and reintegrated into the rest of the textual content. In some embodiments, generating the dataset includes steps 404-410.

At step 404, the method 400 includes obtaining textual content in a first language, the textual content comprising one or more of offensive content or non-offensive content. In some embodiments, the textual content is monolingual and only uses the first language, which in some cases is English. In other cases, the first language can be any other language.

In some implementations, means for performing step 404 include the input module 204 of FIG. 2.

At step 406, the method 400 includes identifying one or more portions within the textual content. In some embodiments, the identifying includes tagging, based on an output of a first trained language model, the one or more portions with at least one content tag (e.g., EOS and/or BOS tokens). In some embodiments, the identifying includes applying a first trained language model to automatically tag the one or more portions based at least on saliency.

In some embodiments, the one or more portions correspond to one or more context-aware salient semantic portions identified by the first trained language model. Such salient portions are determined based on one or more simplex or complex noun phrases of the textual content, one or more maximally frequent contiguous portions of the textual content, one or more salient portions of the textual content determined based at least on a training dataset used by the first trained language model (e.g., the first trained language model has been trained using real-world abusive speech datasets written in mixed languages), one or more denoised portions of the textual content, or a combination thereof. The first trained language model is thereby configured to include any offensive content within the identified one or more salient portions. In some cases, the one or more salient portions each are a phrase (word sequence) within the textual content. In some cases, the one or more salient portions each is a single word. In some cases, the one or more salient portions each is one or more sentences.

In some implementations, the salient portions are identified as silver labels or core phrases by the first trained language model. In some implementations, these salient portions are identified or categorized as offensive or non-offensive based on, e.g., training with hate speech data created from databases of real user text.

In some implementations, these silver labels or core phrases contain have a word count that is within a prescribed range. In some implementations, the phrases have at least a prescribed number of words (minimum but no maximum). In some implementations, the phrases have at most a prescribed number of words (maximum). In some implementations, tagged salient portions are extracted and stored in, e.g., a database.

In some implementations, means for performing step 406 include the identification module 206, the tagging module 208, and/or of FIG. 2.

At step 408, the method 400 includes translating the identified one or more portions to a second language using a second trained language model. In some embodiments, the second trained language model is a neural machine translation model. In some embodiments, the second language is selected as a destination language of choice, and is different from the first language. For example, one or more portions of the textual content in English is translated to corresponding portions in German using the second trained language model. In some implementations, the translation model has been trained to recognize over 100 languages and translate between any two of them. Hence, in various implementations, the identified one or more portions of the textual content can be translated to any language capable of translation by the second trained language model.

In some implementations, means for performing step 408 include the translation module 212 of FIG. 2.

At step 410, the method 400 includes reintegrating the translated one or more portions into the textual content to generate code-switched textual content. In some embodiments, the reintegrating comprises replacing the identified one or more portions in the first language with the corresponding translated one or more portions in the second language. The resulting textual content generated from the reintegration is the code-switched textual content, which combines the first and second languages, which may be used for, e.g., training a language model, such as a multilingual classification model.

In some implementations, means for performing step 410 include the reintegration module 214 of FIG. 2.

At step 412, the method 400 includes training a multilingual classification model. In some embodiments, the multilingual classification model includes XLM-RoBERTa (XLM-R). Other multilingual classification models are used in other embodiments, such as M-BERT, DistilBERT, or the like. In some embodiments, training the multilingual classification model includes steps 414-418.

At step 414, the method 400 includes receiving the generated code-switched textual content at the multilingual classification model. In some embodiments, the code-switched textual content includes textual content generated from the reintegration at step 410.

At step 416, the method 400 includes determining one or more training metrics based on evaluation of an output of the multilingual classification model with respect to the generated code-switched textual content. In some embodiments, the training metrics include loss, which is determined by using a cross-entropy function as a loss function to minimize the error over iterations (over, e.g., batches or epochs). In some embodiments, the training metrics include one or more performance metrics based on the evaluation. In some embodiments, the one or more performance metrics include accuracy, error rate, precision, recall, F1 score, weighted accuracy, or a combination thereof.

At step 418, the method 400 includes adjusting a parameter of the multilingual classification model based on the one or more training metrics. In some cases, the adjustment of the parameter is based the one or more performance metrics. In some embodiments, the parameter includes a learning rate. For example, if a performance metric decreased through an iteration, the training backtracks to the previous model weights, and learning rate is decreased. In some embodiments, the extent to which the learning rate is decreased is controlled with a learning rate schedule. In some embodiments, the parameter includes one or more weights or biases associated with one or more neural network nodes of the multilingual classification model.

Examples of learning rate schedules include time-based decay (learning rate dropped over time), step decay (learning rate dropped by a factor every prescribed number of batches or epochs), exponential decay (learning rate dropped exponentially), and adaptive learning rate methods (e.g., larger updates for more sparse parameters and smaller updates for less sparse parameters).

In some implementations, the learning rate is set to a default starting value (e.g., $\alpha=0.1$) or one of multiple starting values. In some implementations, the learning rate is set to a random value. In some cases, the random value of the learning rate is obtained from within a prescribed range. In some embodiments, the learning rate is adjusted (e.g., downward) according to a condition or a trigger. Examples of such condition or trigger are performance metrics (e.g., accuracy, error rate, precision, recall, and/or F1 score determined at step 416) not being meeting an expected value or threshold, or convergence not being achieved within an expected or defined time (e.g., divergence has likely occurred). However, in some embodiments, the learning rate is not adjusted downward; the learning rate is constant with zero decay (adjusted or set "sideways").

In some implementations, means for performing steps 412-418 include the training module 218 of FIG. 2.

Hence, the multilingual classification model can be trained using a synthetic dataset generated according to method 400.

In some implementations, a language model trained according to method 400 is used to generate a synthetic dataset containing code-switched textual content. In some cases, the code-switched textual content is used to train a language model, such as a multilingual classification model. In some cases, the trained language model can be used for detection and remediation of certain types of content, such as offensive content.

Figure 5:
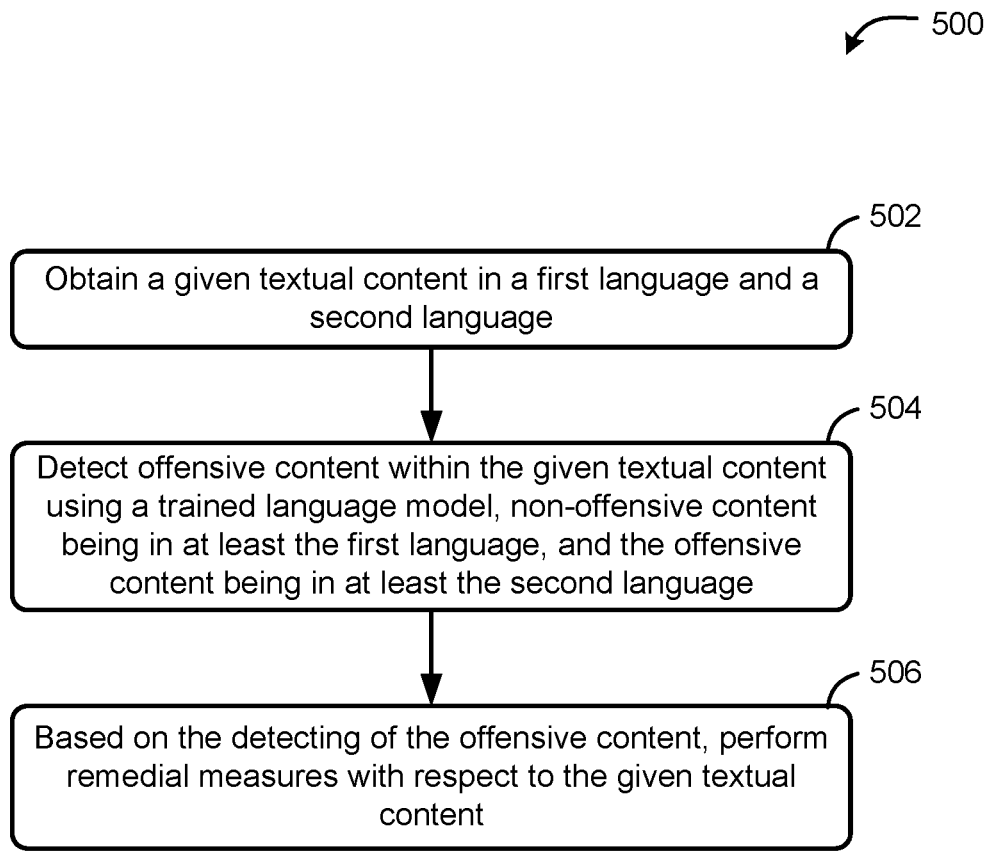
FIG. 5 is a flow diagram of a method of implementing a language model to detect code-switched offensive content, in accordance with some embodiments.

FIG. 5 is a flow diagram of a method 500 of implementing a language model to detect code-switched offensive content, in accordance with some embodiments. In some embodiments, the functionality illustrated in one or more of the steps shown in FIG. 5 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architecture of FIG. 2. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 500. Example components of the computerized apparatus are illustrated in FIG. 6, which are described in more detail below.

It also should be noted that the operations of the method 500 may be performed in any suitable order, not necessarily the order depicted in FIG. 5. In some embodiments, at least some portions of the steps may be performed substantially concurrently. Further, the method 500 may include additional or fewer operations than those depicted in FIG. 5 to accomplish the implementation of the language model.

At step 502, the method 500 includes obtaining a given textual content in a first language and a second language. In some embodiments, the given textual content is code-switched textual content where some portions include text (e.g., words or phrases) in the first language and some portions include text in the second language. Such code-switched textual content is obtained from the aforementioned computerized system or apparatus, e.g., user device or server. In some cases, the code-switched textual content is user-generated textual content, such as that detected on or exchanged over an online platform, such as a social-media platform, a chat box, a comment from a consumer of user-generated content, etc.

At step 504, the method 500 includes detecting offensive content within the given textual content using the language model, non-offensive content being in at least the first language, and the offensive content being in at least the second language. In some embodiments, the language model is trained to detect salient portions within textual content using method 300 or method 400.

In some implementations, such trained language model has been trained using real-world abusive speech datasets written in mixed languages, and is thereby configured to detect any offensive content in the second language within the given textual content. In other implementations, the trained language model is configured to detect offensive content in one or more other languages other than the second language.

At step 506, the method 500 includes, based on the detecting of the offensive content, performing remedial measures with respect to the given textual content. In some embodiments, the remedial measures are performed based at least on the detection of offensive content and is performed with respect to the detected offensive content within the given textual content. For example, remedial measures include removing, obscuring, or replacing characters, words, or phrases; removing, obscuring, or replacing the entire offensive content; removing, obscuring, or replacing a portion of the offensive content; not allowing the given textual content to be transmitted or received; flagging the given textual content for review; throttling user bandwidth; or a combination thereof. In another example, to discourage usage of offensive content, remedial measures include providing a reward or compensation (e.g., in-app rewards or real-world currency) to another user who accurately detects, flags, or submits for review offensive content. In some implementations, such flagging actions contribute to a dataset for further training of the language model. One having ordinary skill in the relevant art will recognize various other remedial measures that can be implemented with respect to the offensive content.

Apparatus

FIG. 6 shows a schematic diagram of components of a computing device 600 that is implemented in a computing system in accordance with some implementations. As illustrated, computing device 600 includes a bus 612 that directly or indirectly couples one or more processors(s) 602, a memory subsystem 604, a communication interface 606, an input/output (I/O) interface 608, and/or one or more user interface components 610. It should be noted that, in some embodiments, various other components are included in a computing device that are not shown in FIG. 6, and/or one or more components shown in FIG. 6 are omitted.

In some embodiments, computing device 600 includes or is coupled to a memory subsystem 604. Memory subsystem 604 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory subsystem 604 also includes one or more hardware devices such as a solid-state memory, one or more hard drives, one or more optical disk drives, or the like. In some embodiments, memory subsystem 604 stores content files such as text-based files, audio files, image files, and/or video files, etc. In some implementations, the content files include documents, pictures, photos, songs, podcasts, movies, etc. In some embodiments, memory subsystem 604 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 602, or processor(s) of another computing device communicatively coupled to computing device 600) to perform various operations or functions such as those described with reference to FIGS. 3-5. In some embodiments, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application are implemented using one or more neural network or machine learning models. In such embodiments, one or more neural network or matching learning models are trained using computing device 600 (or a computing system that includes computing device 600). Furthermore, in some implementations, computing device 600 (or a computing system include computing device 600) executes the one or more neural network or machine learning models as part of the computer program product to perform inference operations. It should be noted, in some embodiments, the neural network or matching learning model(s) are trained using a computing device or system that is the same as, overlaps with, or is separate from the computing device or system performing inference operations.

Communication interface 606 is used by computing device 600 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 606 utilizes various drivers, wireless communication circuitry, network interface circuitry, or the like to enable communication via various communication networks.

I/O interface 608 includes various drivers and/or hardware circuitry for receiving input from various input devices, providing output to various output devices, or exchanging input/output with various input/output devices. Examples of devices coupled to I/O interface 608 include peripheral devices such as a printer, a docking station, a communication hub, a charging device, etc. In some implementations, some devices coupled to I/O interface 608 are used as user interface component(s) 610. In one example, a user operates input elements of user interface component(s)

610 to invoke the functionality of computing device 600 and/or of another device communicatively coupled to computing device 600; a user views, hears, and/or otherwise experiences output from computing device 600 via output elements of user interface component(s) 610. Some user interface component(s) 610 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, or C" and "at least one of A, B, and C" should each be understood to mean {A}, {B}, {C}, {A, B}, {A, C}, {B, C}, or {A, B, C}.

What is claimed is:

1. A method of generating code-switched content for training a language model, the method comprising:
    identifying one or more portions within textual content in a first language, the identified one or more portions each comprising one or more of offensive content or non-offensive content, the identifying comprising tagging, based on an output of a first trained language model, the one or more portions with at least one content tag;
    translating the tagged one or more portions to a second language using a second trained language model; and
    replacing, in the textual content, the tagged one or more portions with the translated one or more portions to generate code-switched textual content;
    wherein:
        the first trained language model comprises a context-aware language model configured to identify one or more salient portions from the textual content based at least on: one or more simplex or complex noun phrases of the textual content, one or more maximally frequent contiguous portions of the textual content, one or more salient portions of the textual content determined based at least on a training dataset used by the first trained language model, one or more denoised portions of the textual content, or a combination thereof; and
        the second trained language model comprises a language model configured to translate between at least the first and second languages.

2. The method of claim 1, wherein:
    the textual content in the first language comprises the offensive content and the non-offensive content;
    the tagged one or more portions comprise the offensive content; and
    the translated one or more portions in the second language comprise a translated version of the offensive content.

3. The method of claim 1, further comprising causing a multilingual model to be trained using the generated code-switched textual content.

4. The method of claim 1, wherein the first trained language model has been trained using at least a real-world abusive speech dataset, and is configured to include the offensive content within the tagged one or more portions.

5. The method of claim 1, wherein the tagging of the one or more portions comprises inserting one or more of an end-of-sentence token or a beginning-of-sentence token.

6. The method of claim 3, wherein the multilingual model comprises a Cross-lingual Language Model Robustly Optimized Bidirectional Encoder Representations from Transformers (BERT) Pre-training Approach (XLM-ROBERTa).

7. The method of claim 5, wherein the inserting of the end-of-sentence token comprises adding the end-of-sentence token to an end of the one or more portions, and the inserting of the beginning-of-sentence token comprises adding the beginning-of-sentence token to a beginning of the one or more portions.

8. The method of claim 7, further comprising discarding one or more portions of the textual content in the first language which are not tagged.

9. A method of generating code-switched content for training a language model, the method comprising:
    identifying one or more portions within textual content in a first language, the identified one or more portions each comprising one or more of offensive content or non-offensive content, the identifying comprising tagging, based on an output of a first trained language model, the one or more portions with at least one content tag;
    translating the tagged one or more portions to a second language using a second trained language model;
    replacing, in the textual content, the tagged one or more portions with the translated one or more portions to generate code-switched textual content; and
    causing a multilingual model comprising a Cross-lingual Language Model Robustly Optimized Bidirectional Encoder Representations from Transformers (BERT)

Pre-training Approach (XLM-ROBERTa) to be trained using the generated code-switched textual content.

10. The method of claim 9, wherein:
the textual content in the first language comprises the offensive content and the non-offensive content;
the tagged one or more portions comprise the offensive content; and
the translated one or more portions in the second language comprise a translated version of the offensive content.

11. The method of claim 9, wherein:
the first trained language model comprises a context-aware language model configured to identify one or more salient portions from the textual content based at least on: one or more simplex or complex noun phrases of the textual content, one or more maximally frequent contiguous portions of the textual content, one or more salient portions of the textual content determined based at least on a training dataset used by the first trained language model, one or more denoised portions of the textual content, or a combination thereof; and
the second trained language model comprises a language model configured to translate between at least the first and second languages.

12. The method of claim 9, wherein the first trained language model has been trained using at least a real-world abusive speech dataset, and is configured to include the offensive content within the tagged one or more portions.

13. The method of claim 9, wherein the tagging of the one or more portions comprises inserting an end-of-sentence token, a beginning-of-sentence token, or both.

14. The method of claim 13, wherein the inserting of the end-of-sentence token comprises adding the end-of-sentence token to an end of the one or more portions, and the inserting of the beginning-of-sentence token comprises adding the beginning-of-sentence token to a beginning of the one or more portions.

15. The method of claim 14, further comprising discarding one or more portions of the textual content in the first language which are not tagged.

* * * * *